(12) United States Patent
Kobayashi et al.

(10) Patent No.: US 7,074,874 B2
(45) Date of Patent: Jul. 11, 2006

(54) LIQUID ALKOXYSILYL-FUNCTIONAL SILICONE RESINS, METHOD FOR THEIR PREPARATION, AND CURABLE SILICONE RESIN COMPOSITIONS

(75) Inventors: Hideki Kobayashi, Chiba (JP); Motoshi Sasaki, Chiba (JP); Toru Masatomi, Chiba (JP)

(73) Assignee: Dow Corning Toray Silicone Co., Ltd. (JP)

( * ) Notice: Subject to any disclaimer, the term of this patent is extended or adjusted under 35 U.S.C. 154(b) by 113 days.

(21) Appl. No.: 10/481,155

(22) PCT Filed: Jun. 27, 2002

(86) PCT No.: PCT/JP02/06531

§ 371 (c)(1),
(2), (4) Date: Dec. 17, 2003

(87) PCT Pub. No.: WO03/002634

PCT Pub. Date: Jan. 9, 2003

(65) Prior Publication Data

US 2004/0158018 A1    Aug. 12, 2004

(30) Foreign Application Priority Data

Jun. 29, 2001    (JP) .............................. 2001-198404

(51) Int. Cl.
*C08G 77/06*    (2006.01)

(52) U.S. Cl. ............................ 528/34; 528/12; 528/33; 528/39

(58) Field of Classification Search .................. 526/37, 526/39

See application file for complete search history.

(56) References Cited

U.S. PATENT DOCUMENTS

| 3,652,711 | A | * | 3/1972 | Tein et al. ..................... 528/23 |
| 4,144,216 | A | * | 3/1979 | Clark et al. ................... 524/356 |
| 4,585,822 | A | * | 4/1986 | Streusand ................... 524/443 |
| 4,736,048 | A | * | 4/1988 | Brown et al. ................. 528/14 |
| 4,929,691 | A |   | 5/1990 | Fillmore et al. |
| 5,109,093 | A | * | 4/1992 | Rees et al. ..................... 528/14 |
| 5,861,453 | A | * | 1/1999 | Datz-Siegel et al. ........ 516/117 |
| 6,040,383 | A | * | 3/2000 | Dauth et al. ................. 525/100 |
| 6,669,949 | B1 | * | 12/2003 | Kennedy et al. ............ 424/405 |

FOREIGN PATENT DOCUMENTS

| JP | 58067728 A | * | 4/1983 |
| JP | HEI 3-239774 | | 10/1991 |

* cited by examiner

*Primary Examiner*—Marc S. Zimmer
(74) *Attorney, Agent, or Firm*—Robert L. McKellar; McKellar IP Law, PLLC

(57) ABSTRACT

Liquid alkoxysilyl-functional silicone resins having excellent storage stability and a method of preparing these liquid alkoxysilyl-functional silicone resins comprising running an equilibration polymerization reaction with components comprising (A) a polydiorganosiloxane and (B) an alkyl polysilicate in the presence of (C) an equilibration polymerization catalyst. Curable silicone resin compositions comprising the aforesaid liquid alkoxy-functional silicone resins which have excellent curability and when cured form a water-repellent coating on a variety of substrate surfaces.

18 Claims, No Drawings

LIQUID ALKOXYSILYL-FUNCTIONAL SILICONE RESINS, METHOD FOR THEIR PREPARATION, AND CURABLE SILICONE RESIN COMPOSITIONS

This invention relates to liquid alkoxysilyl-functional silicone resins having excellent storage stability and a method of preparing these liquid alkoxysilyl-functional silicone resins comprising running an equilibration polymerization reaction with components comprising (A) a polydiorganosiloxane and (B) an alkyl polysilicate in the presence of (C) an equilibration polymerization catalyst. This invention also relates to curable silicone resin compositions comprising the aforesaid liquid alkoxy-functional silicone resins which have excellent curability and when cured form a water-repellent coating on a variety of substrate surfaces.

BACKGROUND OF THE INVENTION

Solventless low-viscosity alkoxysilyl-functional silicone resins having difunctional and trifunctional siloxane units are known (see U.S. Pat. No. 4,929,691). These liquid alkoxysilyl-functional silicone resins are obtained by hydrolyzing the product from an equilibration reaction between polydimethylsiloxane and methyltrialkoxysilane. While these resins can form water-repellent coatings, their curability cannot be considered satisfactory, and in particular their curability at room temperature is unacceptable.

Compositions comprising, for example, tetraalkoxysilane blended in methyl polysilicate are known as polysilicate-type coating compositions (see Japanese Patent Application Publication (Kokai) No. Hei 3-239774 (239,774/1991)). However, the cured coatings afforded by these compositions exhibit an unsatisfactory water repellency.

An object of this invention is to provide liquid alkoxysilyl-functional silicone resins that exhibit excellent storage stability. Another object of this invention is to provide a method for the preparation of these liquid alkoxysilyl-functional silicone resins. Yet another object of this invention is to provide curable silicone resin compositions that exhibit excellent curability and when cured form a water-repellent coating on a variety of substrate surfaces.

THE INVENTION

This invention relates to liquid alkoxysilyl-functional silicone resins having excellent storage stability and a method of preparing these liquid alkoxysilyl-functional silicone resins comprising running an equilibration polymerization reaction with components comprising (A) a polydiorganosiloxane and (B) an alkyl polysilicate in the presence of (C) an equilibration polymerization catalyst. This invention also relates to curable silicone resin compositions comprising the aforesaid liquid alkoxy-functional silicone resins which have excellent curability and when cured form a water-repellent coating on a variety of substrate surfaces.

One embodiment of the present invention is a method comprising running an equilibration polymerization reaction with components comprising (A) a polydiorganosiloxane and (B) an alkyl polysilicate in the presence of (C) an equilibration polymerization catalyst to form liquid alkoxysilyl-functional silicone resins.

The silicon-bonded organic groups in the polydiorganosiloxane (A) can be exemplified by alkyl groups such as methyl, ethyl, and propyl; alkenyl groups such as vinyl, allyl, and 5-hexenyl; aryl groups such as phenyl; and halogenated alkyl groups such as 3,3,3-trifluoropropyl and nonafluorohexyl. Component (A) itself can be exemplified by polydimethylsiloxanes, dimethylsiloxane-phenylmethylsiloxane copolymers, and dimethylsiloxane-diphenylsiloxane copolymers. The molecular structure of component (A) can be straight chain or cyclic. In the case of the straight-chain polyorganosiloxanes, excessively high viscosities (as measured at 25° C.) should be avoided, and these straight-chain polydiorganosiloxanes can be exemplified by trialkylsiloxy-endblocked (e.g., trimethylsiloxy-endblocked) polydimethylsiloxanes with a degree of polymerization no greater than 100. The cyclic polydiorganosiloxanes can be exemplified by the tetramer (ie. having 4 SiO— groups) to the 30-mer (having 30 SiO— groups). Component (A) is preferably a straight-chain or cyclic polydimethylsiloxane and is more preferably a cyclic polydimethylsiloxane. Component (A) can also comprise mixtures of polydimethylsiloxanes having different degrees of polymerization.

The alkyl polysilicate (B) useful in the present method comprises polysiloxanes having alkoxy groups bonded to the silicon atoms in the molecule. Component (B) is ordinarily synthesized by the partial hydrolysis and condensation of a tetraalkoxysilane. The alkoxy group can be exemplified by methoxy, ethoxy, propoxy, and isopropoxy, with methoxy being preferred. Examples of component (B) include methyl polysilicate (which is the partial hydrolysis and condensation product of tetramethoxysilane) and ethyl polysilicate (which is the partial hydrolysis and condensation product of tetraethoxysilane). Preferably, component (B) is a mixture of polysiloxanes ranging from the dimer to the 100-mer and more preferably is a mixture of polysiloxanes ranging from the dimer to the 20-mer. Component (B) is preferably added in an amount from 10 to 1,000 weight parts and more preferably in an amount from 20 to 500 weight parts, in each case per 100 weight parts of component (A). The molar ratio of component (A) to component (B) is generally from 1:0.1 to 1:10 and preferably is 1:0.2 to 1:5.

The equilibration polymerization catalyst (C) accelerates the equilibration polymerization reaction of component (A) and component (B). Basic catalysts and acid catalysts generally used for the equilibration of siloxanes can be used as component (C). Examples of component (C) include basic catalysts such as potassium hydroxide, potassium silanolate, trimethylammonium hydroxide, and trimethylammonium silanolate and acid catalysts such as trifluoromethanesulfonic acid, activated clay, and concentrated sulfuric acid. The acid catalysts are preferred for component (C).

Component (C) is added in a catalytic quantity, with a range of 0.0001 to 5 weight parts per 100 weight parts component (A) being preferred and a range of 0.001 to 0.5 weight part per 100 weight parts component (A) being more preferred.

Optionally, a functional alkoxysilane (D) having the general formula $R^1SiR_n(OR^2)_3$-n may be included in the equilibration step along with components (A), (B), and (C). $R^1$ in this general formula is a $C_1$ to $C_{10}$ monovalent organic group containing an aliphatically unsaturated bond. Examples of $R^1$ include vinyl, allyl, 5-hexenyl, 3-methacryloxypropyl, 2-methacryloxyethyl, 3-acryloxypropyl, and 2-acryloxyethyl, with 3-methacryloxypropyl being preferred. Each $R^2$ in the preceding general formula is a $C_1$ to $C_{10}$ alkyl group. Examples of $R^2$ include methyl, ethyl, propyl, or octyl, with methyl being preferred. Each R in the preceding general formula is a substituted or unsubstituted $C_1$ to $C_{10}$ monovalent hydrocarbyl group. Examples of $R^2$ include alkyl groups such as methyl, ethyl, propyl, and hexyl and alkenyl groups such as vinyl and allyl. The subscript n in the preceding general formula is 0 to 2. Examples of component (D) include vinyltrimethoxysilane, vinylmethyldimethoxysilane, allyl trimethoxysilane, 3-acryloxypropyltrimethoxysilane, 3-acryloxypropylmethyldimethoxysi lane, and 3-methacryloxypropyltrimethoxysi lane.

Component (D) is preferably added in an amount from 0.5 to 100 weight parts per 100 weight parts component (A) and more preferably in an amount from 1 to 50 weight parts per 100 weight parts component (A).

The equilibration polymerization reaction can be run by mixing components (A), (B), (C), and optionally (D), heating the mixture into the temperature range in which component (C) is active, for example, 50 to 200° C., and allowing the components to react, typically for 1 to 10 hours. This equilibration polymerization reaction results in an equilibration among the siloxane bonds in component (A), the siloxane and silicon-alkoxy bonds in component (B), and the silicon-alkoxy bonds in component (D). This equilibration need not proceed to a state of complete or total equilibration, and it may provide a state in which only a certain degree of exchange (equilibration) has been achieved. Some component (A), (B), and/or (D) may therefore remain present post-reaction forming a mixture.

In a preferred embodiment, the present method further comprises thermally removing low-molecular-weight volatile siloxanes such as low-molecular-weight portion of alkoxysilyl-functional silicone resins generated as by-products in the equilibration step or remaining component (A) such as volatile cyclic diorganosiloxanes. Cyclic diorganosiloxane tetramer to decamer, which are volatile species, are desirably removed because these species do not promote the curing reaction of the alkoxysilyl-functional silicone resin. It is particularly preferred that the content of the cyclic diorganosiloxane tetramer, which is produced in large amounts, be brought to 1 weight % or less. These volatile cyclic diorganosiloxanes should be discharged and removed from the system by accelerating their evaporation, as necessary or desired by heating under reduced pressure.

Once the equilibration polymerization reaction has reached the desired point and prior to thermally removing the low-molecular-weight volatile siloxanes, it is preferred to deactivate the equilibration polymerization catalyst to minimize any further re-equilibration. When the equilibration reaction has been run using a basic catalyst, catalyst deactivation can be achieved by neutralization by mixing in an equivalent amount of an acidic substance, for example, carbon dioxide or hydrogen chloride. When the equilibration reaction has been run using an acid catalyst, catalyst deactivation can be achieved by neutralization by mixing in an equivalent amount of a basic substance, for example, sodium bicarbonate, sodium carbonate, or sodium hydroxide. When the catalyst is thermally decomposable, it can be decomposed by raising the temperature by heating. Deactivation of this equilibration polymerization catalyst can be carried out before or after removal of the volatile siloxanes. After the basic or acid catalyst has been satisfactorily deactivated by neutralization, the neutralization salt therefrom can remain in the reaction solution as the volatile siloxanes is thermally removed or can be removed from the reaction solution by, for example, filtration.

In a preferred embodiment the present method further comprises partially hydrolyzing the liquid alkoxysilyl-functional silicone resins to adjust the amount of alkoxy in the molecule after thermally removing the low-molecular-weight volatile siloxanes. The amount of water added should be less than the number of moles necessary for hydrolysis of the alkoxy groups in component (B). Catalysts known in the art to promote condensation reactions can also be added to this step. Examples of these condensation reaction-promoting catalysts include organotin compounds such as dibutyltin diacetate, dibutyltin dioctate, dibutyltin dilaurate, dibutyltin dimaleate, dioctyltin dilaurate, dioctyltin dimaleate, and tin octylate; organotitanate compounds such as isopropyl tris(isostearoyl) titanate, isopropyl tris(dioctylpyrophosphato) titanate, bis(dioctylpyrophosphato)oxyacetete titanate, and tetraalkyl titanate; organozirconium compounds such as tetrabutyl zirconate, tetrakis(acetylacetonato)zirconium, tetraisobutyl zirconate, butoxytris(acetylacetonato) zirconium, and zirconium naphthenate; organoaluminum compounds such as tris(ethyl acetoacetato)aluminum and tris(acetylacetonato)aluminum; organoinetallic catalysts such as zinc naphthenate, cobalt naphthenate, and cobalt octylate; and amine catalysts, excluding organosilicon compounds, such as diethanolamine and triethanolamine.

Preferably, this condensation reaction-promoting catalyst is added in an amount from 0.1 to 10 weight parts and more preferably in an amount from 0.5 to 10 weight parts, in each case per 100 weight parts liquid alkoxysilyl-functional silicone resin. This condensation reaction-promoting catalyst may remain in the liquid alkoxysilyl-functional silicone resin even after the hydrolysis.

The liquid alkoxysilyl-functional silicone resin may be diluted with organic solvent during the partial hydrolysis step of the present method. Any organic solvent capable of dissolving the liquid alkoxysilyl-functional silicone resin can be used, and the particular organic solvent should be selected based on the type and molecular weight of the liquid alkoxysilyl-functional silicone resin. The organic solvent may be one solvent or a mixture of two or more solvents. Examples of useful organic solvents include alcohols such as methanol, ethanol, isopropanol, butanol, and isobutanol; esters such as ethyl acetate, butyl acetate, and isobutyl acetate; ketones such as acetone, methyl ethyl ketone, and methyl isobutyl ketone; aliphatic hydrocarbons such as hexane, octane, and heptane; chlorinated organic solvents such as chloroform, methylene chloride, trichloroethylene, and carbon tetrachloride; aromatic hydrocarbons such as toluene and xylene; and volatile silicones such as hexamethyldisiloxane and octamethyltrisiloxane.

The present liquid alkoxysilyl-functional silicone resin, which is an equilibration reaction product from components (A) and (B) or from components (A), (B), and (D), is an organopolysiloxane comprising mainly tetrafunctional siloxane units ($SiO_{4/2}$ units) and difunctional siloxane units ($R^3_2SiO_{2/2}$ units) although trifunctional siloxane units ($R^3SiO_{3/2}$ units) and/or the monofunctional siloxane units ($R^3_3SiO_{1/2}$ units) may also be present. These siloxane units are randomly distributed within the molecule. Each $R^3$ is a $C_1$ to $C_{10}$ substituted or unsubstituted monovalent hydrocarbyl group or a monovalent organic group containing an aliphatically unsaturated bond. Examples of the $C_1$ to $C_{10}$ substituted or unsubstituted monovalent hydrocarbyl group are as described above for R. Examples of the monovalent organic group containing an aliphatically unsaturated bond are as described above for $R^1$.

Generally, the liquid alkoxysilyl-functional silicone resin will contain from 2 to 44 weight % alkoxy groups in the molecule and preferably contains from 4 to 30 weight %. Alkoxy groups may be present in any of the aforementioned siloxane units. The liquid alkoxysilyl-functional silicone resin will generally have a viscosity at 25° C. of from 2 to 500 mm²/s and preferably from 5 to 100 mm²/s. The weight average molecular weight of the liquid alkoxysilyl-functional silicone resin will generally be no greater than 10,000 and is preferably no greater than 7,000.

Another embodiment of the present invention is a curable silicone resin composition comprising a liquid alkoxysilyl-functional silicone resin and a curing catalyst. The liquid alkoxysilyl-functional silicone resin in the present embodiment is as described above. The curable silicone resin composition cures rapidly at room temperature or upon heating. The curing catalyst can be a condensation reaction-promoting catalyst as already described above or those equilibration polymerization catalysts that exhibit a cure-promoting activity. Examples of useful cure-promoting equilibration polymerization catalysts include strongly acidic equilibration polymerization catalysts such as, trifluoromethanesulfonic acid and concentrated sulfuric acid. These curing catalysts are used preferably in an amount from 0.05 to 15 weight parts and more preferably in an amount from 0.1 to 10 weight parts, in each case per 100 weight parts of the liquid alkoxysilyl-functional silicone resin. When the liquid alkoxysilyl-functional silicone resin is made using trifluoromethanesulfonic acid or concentrated sulfuric acid as component (C), or the condensation reaction-promoting catalyst used for hydrolysis remains present, a fresh addition of curing catalyst may not be necessary since the aforementioned catalysts can function as the cure-promoting catalyst. However, when these are present in an inadequate amount, additional curing catalyst should be added in sufficient quantity to make up the deficit.

The organic solvent may be allowed to remain when the liquid alkoxysilyl-functional silicone resin has been subjected to partial hydrolysis in organic solvent. In addition, organic solvent can be admixed when dilution becomes necessary. When necessary or desired, chlorinated paraffin, solid paraffin, liquid paraffin, vaseline, and so forth can be added to the curable composition. In addition, the following can be added as appropriate: pigments such as colorant pigments, filler pigments, and antirust pigments, as well as plasticizers, sag inhibitors, silane coupling agents, and antistaining agents. It is preferred that no more than 10 weight parts and more preferably no more than 9 weight parts of these optional ingredients be added, in each case per 100 weight parts liquid alkoxysilyl-functional silicone resin.

BEST MODE FOR CARRYING OUT THE INVENTION

Examples

The invention is explained below through working examples, disclosed to further teach, but not limit, the invention, which is properly delineated by the appended claims. The values reported for viscosity in the examples were measured at 25° C. The contact angle versus water was measured using a contact angle meter (CA-Z from Kyowa Kaimen Kagaku Kabushiki Kaisha).

Example 1

The following were introduced into a flask: 148 g of a mixture of cyclic dimethylsiloxanes (mixture of the tetramer to decamer) and 117.5 g methyl polysilicate (average molecular weight=550, $SiO_2$ content=51 weight %, viscosity=10 mPa·s) comprising the partial hydrolysis and condensation product of tetramethoxysilane. 0.3 g trifluoroinethanesulfonic acid was then added with stirring and the flask was heated to 70° C. and stirred for 8 hours. The generation of a large number of peaks was observed when the reaction solution was analyzed by gas chromatography during the stirring period, which confirmed that the equilibration reaction between the cyclic dimethylsiloxane and methyl polysilicate had proceeded. Then, while holding at 70° C., neutralization was carried out by bubbling in ammonia gas and the volatile fraction was thereafter stripped off under reduced pressure. After cooling, the neutralization salt that had been produced was filtered off on filter paper to give 235 g liquid methoxysilyl-functional silicone resin. This resin had a viscosity of 24 $mm^2/s$ and a colorless and transparent appearance.

Analysis of this methoxysilyl-functional silicone resin by gas chromatography demonstrated that it was an equilibration reaction product with a distribution approximately from the diner to the 20-mer and that it contained no more than 1 weight % octamethylcyclotetrasiloxane. The results of $^{13}C$-NMR and $^{29}Si$-NMR analyses demonstrated that this silicone resin was an organopolysiloxane whose main skeleton comprised the difunctional siloxane unit (($CH_3)_2SiO_{2/2}$ unit) and tetrafunctional siloxane unit ($SiO_{4/2}$ unit) and that the silicone resin had a methoxy group content of 27 weight %. Its weight average molecular weight as measured by GPC was 3,500.

The liquid methoxysilyl-functional silicone resin produced as described in this Example 1 was sealed in a glass bottle and held for 3 months at room temperature. The appearance after this 3-month holding period was colorless and transparent and showed no change from the appearance immediately after synthesis. No gel production was observed. No significant change in viscosity was observed since the viscosity after the 3-month holding period was also almost the same as the viscosity immediately after synthesis. These results demonstrated that the silicone resin had excellent storage stability.

A curable silicone resin composition was prepared by adding 3 weight parts dibutyltin diacetate as curing catalyst to 100 weight parts of the liquid methoxysilyl-functional silicone resin prepared as described above and mixing at room temperature. The resulting composition was coated on a glass slide and air-dried: a cured coating was formed after 2 days. This coating was thoroughly cured and did not give a tacky sensation when touched with a finger. The surface of this cured coating was smooth and gave a contact angle versus water of 100°, which indicated an excellent water repellency.

Example 2

The following were introduced into a flask: 74 g octamethylcyclotetrasiloxane and 117 g methyl polysilicate (average molecular weight=550, $SiO_2$ content=51 weight %, viscosity=10 mPa·s) comprising the partial hydrolysis and condensation product of tetramethoxysilane. 0.2 g trifluoromethanesulfonic acid was then added with stirring and the flask was heated to 80° C. and stirred for 7 hours. The generation of a large number of peaks was observed when the reaction solution was analyzed by gas chromatography during the stirring period, which confirmed that the equilibration reaction between the octamethylcyclotetrasiloxane and methyl polysilicate had proceeded. Then, while holding at 80° C., ammonia gas was bubbled in for the purpose of neutralization and nitrogen gas was bubbled in thereafter. After cooling the neutralization salt was filtered off on filter paper to give 186 g liquid methoxysilyl-functional silicone resin. This resin had a viscosity of 10 $mm^2/s$ and a colorless and transparent appearance.

Analysis of this resin by gas chromatography demonstrated that it was an equilibration reaction product with a distribution approximately from the tetramer to the 20-mer and that it contained no more than 1 weight % octainethylcyclotetrasiloxane. The results of $^{13}$C-NMR and $^{29}$Si-NMR analyses demonstrated that this silicone resin was an organopolysiloxane whose main skeleton comprised the difunctional siloxane unit (($CH_3$)$_2$$SiO_{2/2}$ unit) and tetrafunctional siloxane unit ($SiO_{4/2}$ unit) and that the silicone resin had a methoxy group content of 36 weight %. Its weight average molecular weight as measured by GPC was 1,500.

The liquid methoxysilyl-functional silicone resin produced as described in this Example 2 was sealed in a glass bottle and held for 3 months at room temperature. The appearance after this 3-month holding period was colorless and transparent and showed no change from the appearance immediately after synthesis. No gel production was observed. No significant change in viscosity was observed since the viscosity after the 3-month holding period was also almost the same as the viscosity immediately after synthesis. These results demonstrated that the silicone resin had excellent storage stability.

A curable silicone resin composition was prepared by adding 3 weight parts dibutyltin diacetate as curing catalyst to 100 weight parts of the liquid methoxysilyl-functional silicone resin prepared as described in this Example 2 and mixing at room temperature. The resulting composition was coated on a glass slide and air-dried: a cured coating was formed after 3 days. This coating was thoroughly cured and did not give a tacky sensation when touched with a finger. The surface of this cured coating was smooth and gave a contact angle versus water of 99°, which indicated excellent water repellency.

Example 3

The following were introduced into a flask: 81 g of a mixture of cyclic dimethylsiloxanes (mixture of the tetramer to decamer), 1116 g methyl polysilicate (average molecular weight=550, $SiO_2$ content=51 weight %, viscosity=10 mPa·s) comprising the partial hydrolysis and condensation product of tetramethoxysilane, and 27 g γ-methacryloxypropyltrimethoxysilane. 0.2 g trifluoromethanesulfonic acid was then added with stirring and the flask was heated to 75° C. and stirred for 8 hours. The generation of a large number of peaks was observed when the reaction solution was analyzed by gas chromatography during the stirring period, which confirmed that the equilibration reaction between the siloxane and methoxy groups had proceeded. After cooling to room temperature, neutralization was carried out by bubbling in ammonia gas and the neutralization salt thereby produced was filtered off across filter paper. The volatiles were subsequently removed by stripping by heating under reduced pressure leaving 246 g liquid methoxysilyl-functional silicone resin bearing the γ-methacryloxypropyl group. This resin had a viscosity of 7 mm$^2$/s and a colorless and transparent appearance.

Analysis of this resin by gas chromatography demonstrated that it was an equilibration reaction product with a distribution approximately from the trimer to the 20-mer and that it contained no more than 1 weight % octamethylcyclotetrasiloxane. The results of $^{13}$C-NMR and $^{29}$Si-NMR analyses demonstrated that this silicone resin was an organopolysiloxane whose main skeleton comprised the difunctional siloxane unit (($CH_3$)$_2$$SiO_{2/2}$ unit), trifunctional siloxane unit ($CH_2$=C($CH_3$)COO$C_3H_6$$SiO_{3/2}$ unit), and tetrafunctional siloxane unit ($SiO_{4/2}$ unit) and that the silicone resin had a methoxy group content of 35 weight %. Its weight average molecular weight as measured by GPC was 1,200.

The liquid methoxysilyl-functional silicone resin produced as described above in this Example 3 was sealed in a glass bottle and held for 3 months at room temperature. The appearance after this 3-month holding period was colorless and transparent and showed no change from the appearance immediately after synthesis. No gel production was observed. No significant change in viscosity was observed since the viscosity after the 3-month holding period was also almost the same as the viscosity immediately after synthesis. These results demonstrated that the silicone resin had excellent storage stability.

A curable silicone resin composition was prepared by adding 5 weight parts dibutyltin diacetate as curing catalyst to 100 weight parts of the liquid methoxysilyl-functional silicone resin prepared as described in this Example 3 and mixing at room temperature. The resulting composition was coated on a glass slide and air-dried: a cured coating was formed after 3 days. This coating was thoroughly cured and did not give a tacky sensation when touched with a finger. The surface of this cured coating was smooth and gave a contact angle versus water of 100°, which indicated excellent water repellency.

Example 4

50 g methanol and 50 g of the liquid methoxysilyl-functional silicone resin prepared in Example 1 were mixed. To this mixture was added 0.6 g tetra-n-butyl orthotitanate and then a mixture of 0.3 g water and 1 g methanol and partial hydrolysis was subsequently carried out by mixing for 1 hour. The post-hydrolysis methoxy group content was 25 weight %. A cured coating was formed after 2 days when the resulting partial hydrolyzate was coated on a glass slide and air-dried. This coating was thoroughly cured and did not give a tacky sensation when touched with a finger. The surface of this cured coating was smooth and gave a contact angle versus water of 100°, which indicated excellent water repellency.

Comparative Example 1

The following were introduced into a flask: 148 g of a mixture of cyclic dimethylsiloxanes (mixture of the tetramer to decamer) and 30 g methyltrinethoxysilane. 0.15 g trifluoromethanesulfonic acid was then added with stirring and the flask was heated to 80° C. and stirred for 6 hours. The generation of a large number of peaks was observed when the reaction solution was analyzed by gas chromatography during the stirring period, which confirmed that the equilibration reaction between the siloxane and methoxy groups had proceeded. Then, after cooling to room temperature, neutralization was carried out by bubbling in ammonia gas and the neutralization salt thereby produced was filtered off across filter paper. The volatiles were subsequently removed by stripping by heating under reduced pressure to give a liquid methoxysilyl-functional silicone resin. This silicone resin was an organopolysiloxane whose main skeleton comprised the difunctional siloxane unit (($CH_3$)$_2$$SiO_{2/2}$ unit) and trifunctional siloxane unit ($CH_3$$SiO_{3/2}$ unit).

A silicone resin composition was prepared by adding 5 weight parts dibutyltin diacetate as curing catalyst to 100 weight parts of the liquid methoxysilyl-functional silicone resin prepared as described in this Comparative Example 1 and mixing at room temperature. When the resulting composition was coated on a glass slide and air-dried, it was still tacky when touched with a finger even after 2 days, which confirmed that the cure was inadequate.

INDUSTRIAL APPLICABILITY

The present alkoxysilyl-functional silicone resins are liquids at room temperature and have excellent long-term storage stability both in a solventless state and when diluted with organic solvent. The silicone resins obtained by equilibrating components (A) through (D) contain aliphatically unsaturated bonds in the molecule, and therefore offer the advantage of high reactivity with radical polymerization-reactive organic polymers, e.g., acrylic resins. A preferred preparative method removes the volatile low-molecular-weight siloxanes that includes the cyclic diorganosiloxane tetramer, and therefore affords a highly curable silicone resin. Moreover, since the removed cyclic diorganosiloxane can be reused as a starting material in the equilibration reaction, the preparative method has the advantage of enabling continuous production of the alkoxysilyl-functional silicone resins and making possible a substantial reduction in the amount of waste generation.

The present curable silicone resin composition can form a smooth, water-repellent film on the surface of a variety of inorganic and organic substrates. In particular, the curable silicone resin composition is useful as a coating agent for such inorganic materials as glasses, ceramics, and metals.

What is claimed is:

1. A method of forming liquid alkoxysilyl-functional silicone resins, the method comprising reacting (A) a polydiorganosiloxane, (B) an alkyl polysilicate, and (D) a functional alkoxysilane with the general formula $R^1SiR_n(OR^2)_{3-n}$, wherein each R is a substituted or unsubstituted $C_1$ to $C_{10}$ monovalent hydrocarbyl group, $R^1$ is a $C_1$–$C_{10}$ monovalent organic group having an aliphatically unsaturated bond, each $R^2$ is a $C_1$ to $C_{10}$ alkyl group, and n is 0 to 2.

2. The method of claim 1 wherein (A) is selected from the group consisting of (i) a straight chain polydimethylsiloxane and (ii) a cyclic polydimethylsiloxane and (B) is selected from the group consisting of (a) methyl polysilicate and (b) ethyl polysilicate.

3. The method of claim 1, wherein (B) is a mixture of polysiloxanes ranging from dimer to 100-mer.

4. The method of claim 1, where (C) is an acid catalyst.

5. The method of claim 1, where the method further comprises thermally removing low-molecular-weight volatile siloxanes so no more than 1 weight % cyclic tetramer remains.

6. The method of claim 5, wherein the method further comprises partially hydrolyzing the liquid alkoxysilyl-functional silicone resin to adjust the amount of alkoxy groups.

7. The liquid alkoxysilyl-functional silicone resin prepared by the method of claim 1.

8. A liquid alkoxysilyl-functional silicone resin obtained by the method of claim 1 comprising tetrafunctional siloxane units ($SiO_{4/2}$ units) and difunctional siloxane ($R^3_2SiO_{2/2}$) units, where each $R^3$ is selected from the group consisting of (i) a $C_1$ to $C_{10}$ substituted monovalent hydrocarbyl group, (ii) an unsubstituted monovalent hydrocarbyl group, and (iii) a monovalent organic group containing an aliphatically unsaturated bond.

9. The liquid alkoxysilyl-functional silicone resin of claim 8 where the liquid alkoxysilyl-functional silicone resin has a viscosity at 25° C. of from 2 to 500 $mm^2/s$, a weight average molecular weight no greater than 10,000 and from 2 to 44 weight % alkoxy groups per molecule.

10. A curable alkoxysilyl-functional silicone resin composition comprising the liquid alkoxysilyl-functional silicone resin of claim 7 and a curing catalyst.

11. The method of claim 1, wherein (A) is selected from the group consisting of (i) a straight chain polydimethylsiloxane and (ii) a cyclic polydimethylsiloxane and (B) is selected from the group consisting of (a) methyl polysilicate and (b) ethyl polysilicate.

12. The method of claim 1, wherein (B) is a mixture of polysiloxanes ranging from dimer to 100-mer.

13. The method of claim 2, wherein (B) is a mixture of polysiloxanes ranging from dimer to 100-mer.

14. The method of claim 2, where (C) is an acid catalyst.

15. The method of claim 3, where (C) is an acid catalyst.

16. The method of claim 12, where (C) is an acid catalyst.

17. The method of claim 13, where (C) is an acid catalyst.

18. The method of claim 1, where (C) is an acid catalyst.

* * * * *

UNITED STATES PATENT AND TRADEMARK OFFICE
CERTIFICATE OF CORRECTION

PATENT NO. : 7,074,874 B2 Page 1 of 1
APPLICATION NO. : 10/481155
DATED : July 11, 2006
INVENTOR(S) : Hideki Kobayashi et al.

It is certified that error appears in the above-identified patent and that said Letters Patent is hereby corrected as shown below:

Column 9, line 32, after "(B) an," delete "alkyl polysilicate", insert --alkylpolysilicate--.

Column 9, line 34, after "$(OR^2)_{3-n}$" delete the comma ",".

Column 9, line 35, before "$C_{10}$" delete "to" and insert therein a dash -- - -- between "$C_1$" and "$C_{10}$".

Column 9, line 38, before "$C_{10}$" delete "to" and insert therein a dash -- - -- between "$C_1$" and "$C_{10}$".

Column 9, line 38, after "0 to 2" delete the period "." and insert therein -- , in the presence of (C) an equilibrium polymerization catalyst. --.

Signed and Sealed this

Eighteenth Day of December, 2007

JON W. DUDAS
*Director of the United States Patent and Trademark Office*